United States Patent [19]
Park et al.

[11] Patent Number: 6,017,425
[45] Date of Patent: Jan. 25, 2000

[54] PHOTOCATALYST, PREPARATION THEREFOR AND METHOD FOR PRODUCING HYDROGEN USING THE SAME

[75] Inventors: Dae Chul Park; Sang Yun Lim, both of Daejon, Rep. of Korea

[73] Assignee: Korea Research Institute of Technology, Daejon, Rep. of Korea

[21] Appl. No.: 09/029,829

[22] PCT Filed: Sep. 17, 1996

[86] PCT No.: PCT/KR96/00161

§ 371 Date: Mar. 10, 1998

§ 102(e) Date: Mar. 10, 1998

[87] PCT Pub. No.: WO97/12668

PCT Pub. Date: Apr. 10, 1997

[30]     Foreign Application Priority Data

Sep. 18, 1995 [KR]   Rep. of Korea ................. 95-30416

[51] Int. Cl.[7] ................. C01B 3/00; B01J 27/02; B22F 3/26
[52] U.S. Cl. ................. 204/157.52; 502/330; 502/326; 502/344; 502/216; 502/222; 502/242; 502/243; 502/245; 502/246; 502/338; 502/339; 419/27
[58] Field of Search ................. 204/157.52; 502/330, 502/326, 344, 216, 218, 222, 242, 243, 245, 246, 338, 339; 419/27

[56]           References Cited

FOREIGN PATENT DOCUMENTS

96/06675  3/1996  WIPO .

OTHER PUBLICATIONS

Derwent Abstract AN 95–166550 [22] of JP 07 088 380, Apr. 1995.
Patent Abstracts of Japan, vol. 11, No. 262 (C–442), of JP 62–65 743, Mar. 1987.
Borodenko et al., "Kinetics of Adsorption of Cesium Vapors on Zinc", Zh. Fiz. Khim., vol. 41, No. 3, pp. 545–549. Abstract Only, 1967, no month available.

Borodenko et al., "Exchange Adsorption of Cesium and Hydrogen or Carbon Monoxide on Zinc Sulfide", Zh. Fiz. Khim., vol. 43, No. 7, pp. 1854–1855. Abstract Only, 1969, no month available.

*Primary Examiner*—Edna Wong
*Attorney, Agent, or Firm*—Jacobson, Price, Holman & Stern, PLLC

[57]           ABSTRACT

The present invention relates to a photocatalyst for producing hydrogen, harmless to the environment and by which a large quantity of hydrogen is efficiently produced at low temperatures without using any organic promoter, represented by the following formula:

$$Cs(a)X(c)/T(b)$$

wherein "a" represents a percentage by weight of impregnated Cs on the basis of the weight of a carrier, being limited up to 6.0; "X" is a promoter selected from Ni, Co and Fe; "c" represents a percentage by weight of the promoter on the basis of the total weight of Cs and the promoter, being limited up to 50.0; "T" is the carrier consisting of a zinc sulfide mixture comprising an inorganic compound and zinc sulfide with the molar ratio of zinc:sulfur ranging from 1:0.1 to 1:2.8; and "b" represents a percentage by weight of the inorganic compound on the basis of the total amount of the ZnS mixture, being limited up to 50. The present invention also relates to a method for preparing the photocatalyst and to a method for producing hydrogen using the photocatalyst.

12 Claims, No Drawings

PHOTOCATALYST, PREPARATION THEREFOR AND METHOD FOR PRODUCING HYDROGEN USING THE SAME

This is a national stage application of PCT/KR96/00161 filed Sep. 17, 1996.

BACKGROUND OF THE INVENTION

1. Field of the invention

The present invention relates, in general, to a novel photocatalyst and, more particularly, to a photoreaction in which hydrogen can be efficiently and economically produced from water in the presence of the photocatalyst. Also, the present invention is concerned with a method for preparing the photocatalyst and a method for producing hydrogen.

2. Description of the Prior Art

Hydrogen is a very important material in the chemical industry. For example, it is used to produce ammonia and to synthesize hydrogen chloride. Also, it is an essential material for hydrogenation in which unsaturated compounds are converted into saturated ones. In addition, hydrogen plays a pivotal role in improving the quality of petroleum products, that is, in the hydrotreating processes including hydrogen addition, desulfurization, denitrogenation and demetallization. Another example of the use of hydrogen is the contact hydrogenation of carbon dioxide in which carbon dioxide, which causes the warmth of the globe, is reclaimed, immobilized and reused. In addition, hydrogen is anticipated to be a pollution-free, clear energy source substituting for the existing fossil fuels.

Conventional techniques for obtaining hydrogen include extraction from fossil fuels, such as naphtha, modification of natural gas, reaction of vapor with iron, reaction of water with metal, electrolysis of water and etc. These techniques are economically unfavorable because immense heat or electric energy is required. The conventional techniques have another disadvantage of generating a large quantity of by-products, carbon dioxide or oxygen (upon electrolysis). As mentioned above, carbon dioxide is a serious air pollutant causing the greenhouse effect of the globe. When oxygen is generated, the hydrogen is difficult to separate from the oxygen, owing to which the process becomes complicated. Such by-products could make it difficult to obtain high purity hydrogen in high yields.

Since hydrogen production using such conventional techniques is usually carried out at relatively high temperatures, most of the relating equipment, e.g. reactors and purifying apparatuses, are designed to be resistant to heat and thus, they are very expensive, which is an economically unfavorable factor.

Hydrogen gas can readily escape from the gravity of the earth because it is of low specific gravity and most of it exists in water or inorganic forms. For these reasons, only a small quantity of hydrogen exists in the atmosphere. Therefore, the development of the techniques whereby a high purity of hydrogen can be efficiently obtained from water is very important in that the urgent problem of exploiting substitute energy sources can be solved and the material for the chemical industry can be secured.

Recently the techniques for producing hydrogen from water have been developed in which a photocatalyst is used to decompose water into hydrogen and oxygen. However, there are few published prior arts relating to the photocatalyst for producing hydrogen, the representatives of which are exemplified by Japanese Pat. Laid-Open Publication Nos. Sho. 62-191045, Sho. 63-107815 and Hei. 1-208301.

Japanese Pat. Laid-Open Publication No. Sho. 62-191045 discloses that hydrogen is generated from an aqueous $Na_2S$ solution in the presence of a rare-earth element compound as a photo-catalyst by a photolysis reaction. The rare-earth element compound has an advantage of exhibiting an optical catalytic activity in the range of the visible light.

Japanese Pat. Laid-Open Publication No. Sho. 63-107815 describes a photolysis reaction in which a composite oxide of niobium and alkali earth metal is used as a photocatalyst, to generate hydrogen from a methanol solution in water. Similarly, this photocatalyst has an advantage of being active in the range of the visible light.

However, these above prior arts are disadvantageous in that the amount of the hydrogen generated is very small.

In Japanese Pat. Laid-Open Publication No. Hei. 1-208301, water and aluminum are subjected to a thermal reaction, to generate hydrogen. This has an advantage of being high in efficiency of hydrogen-generating but a significant disadvantage of requiring immense thermal energy because the thermal reaction occurs only at 600° C. or higher.

Korean Pat. Appl'n. No. 95-7721, which is believed to solve the above problems to some degree, by the present inventor, suggests a photocatalyst represented by the following general formula I:

$$Cs(a)/K_4Nb_6O_{17} \qquad \qquad I$$

In the presence of the photocatalyst, ultraviolet light is irradiated onto an aqueous solution mixed with oxygen-containing organic compounds, such as formaldehyde and alcohol, acting as a hydrogen-generating promoter, to produce hydrogen from water.

This technique has little affect on the environment and can generate hydrogen at low temperatures, e.g. room temperature. However, in spite of using the oxygen-containing organic compounds as a hydrogen-generating promoter, hydrogen is produced at unsatisfactory amounts.

SUMMARY OF THE INVENTION

It is an objective of the present invention to overcome the above problems encountered in prior arts and to provide a novel photocatalyst for producing hydrogen, which is harmless to the environment and by which a large quantity of hydrogen is efficiently produced at low temperatures, e.g. room temperature, without using any organic promoter.

It is another objective of the present invention to provide a method for preparing the photocatalyst.

It is a further objective of the present invention to provide a method for economically producing hydrogen using the photocatalyst.

There has been significant and intensive research and development directed to the definition and manufacture of a photocatalyst for hydrogen production for a wide variety of commercial applications by the present inventor. In accordance with the research and development, the present invention is based on the finding that a ZnS carrier comprising ZnS (molar ratio Zn:S=1:0.1–2.8) alone or in combination with inorganic compound selected from the group consisting of silica, alumina, niobate, titania and zirconia has a powerful ability to generate hydrogen in high efficiency when in contact with primary or secondary distilled water or simply pretreated water at 10 to 85° C. and at 0.1 to 5 atm. If necessary, cesium, acting as an inorganic active ingredient, and a promoter selected from the group consisting of Ni, Co and Fe can be impregnated in the carrier.

In accordance with an aspect of the present invention, there is provided a photocatalyst represented by the following general formula II:

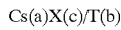
Cs(a)X(c)/T(b)    II wherein character "a" represents a percentage by weight of impregnated Cs on the basis of the weight of a carrier, being limited up to 6.0; character "X" is a promoter selected from Ni, Co and Fe and may be mixed and impregnated following the impregnation of Cs; character "c" represents a percentage by weight of the promoter on the basis of the total weight of Cs and the promoter, being limited up to 50.0; character "T" is the carrier consisting of a ZnS mixture of ZnS (molar ratio Zn:S=1:0.1–2.8) and an inorganic compound selected from silica, alumina, niobate, titania and zirconia; and character "b" represents a percentage by weight of the inorganic compound on the basis of the total weight of the ZnS mixture, being limited up to 50.

In accordance with another aspect of the present invention, there is provided a method for preparing a photocatalyst, comprising the steps of: mixing Zn and S in a molar ratio of 1:0.1–2.8, sufficiently pulverizing the mixture with a mechanical means, such as a ball mill, sintering the mixture at 200 to 700° C. for 2 to 5 hours, to give a carrier, and optionally impregnating an inorganic active ingredient (Cs) and/or a promoter (X) in the carrier. When the carrier is made of ZnS and another inorganic compound, such as silica, the inorganic compound is added to the ZnS mixture at up to 50% by weight, prior to the mixing step.

In accordance with a further aspect of the present invention, there is provided a method for producing hydrogen, in which ultraviolet or visible light is irradiated onto water in the presence of the photocatalyst at 10 to 85° C. and at 0.1 to 5 atm, to induce the photolysis of water to generate hydrogen gas.

DETAILED DESCRIPTION OF THE INVENTION

The present invention pertains to a photocatalyst which is superior in producing hydrogen. According to the present invention, it is obtained by mixing zinc (Zn) and sulfur (S) at a predetermined molar ratio in a ball mill, centrifuging the mixture at a speed of 100 to 130 rpm for 24 to 72 hours, and sintering it at 200 to 700° C. for 2 to 5 hours. The sintered body itself shows the catalytic activity in the photolysis of water. In addition, it can serve as a carrier when impregnating an active ingredient, such as cesium, and optionally a promoter, such as Ni, Fe and Co.

As to the amount of zinc and sulfur, it is preferred that the molar ratio of zinc to sulfur ranges from 1:0.1 to 1:2.8 and more preferably from 1:0.7 to 1:1.5. For example, if the molar ratio departs from the ranges, the efficacy of the photocatalyst is very low.

The carrier can be prepared from the ZnS alone or in combination with inorganic compounds. In the case of combination, inorganic compounds are added at an amount of up to 50% by weight based on the total amount of the carrier. For example, if the amount of the inorganic compounds exceeds 50% by weight, the hydrogen generation capacity of the resulting photocatalyst is significantly attenuated. Available inorganic compounds are selected from the group consisting of silica, alumina, niobate, titania and zirconia.

When the carrier is made from high purity ZnS alone, the resulting photocatalyst is superior in catalytic activity, so that a large amount of hydrogen can be obtained. However, such a carrier is very poor in light fastness. In contrast, the carrier made from the ZnS mixture consisting of the ZnS and the inorganic compounds has lower catalytic activity but is significantly improved in light fastness.

As mentioned above, the photocatalyst of the present invention can be obtained by impregnating a catalytically active inorganic ingredient in the carrier, which also has catalytic activity. Cesium (Cs) is suitable for the catalytically active inorganic ingredient and the resulting photocatalyst is much more active than the carrier alone. The active ingredient is preferably added at an amount of up to 6.0% by weight and more preferably up to 3.5% by weight. For example, if too much active ingredient is impregnated, the impregnation effect is remarkably lowered.

Optionally, promoter(s) may be impregnated at an amount of up to 50% by weight based on the total weight of the catalytically active ingredient and the promoter(s). Available are Ni, Co and Fe. When the active ingredient (Cs) alone is used, the activity of the resulting photocatalyst (the reactivity to light) decreases soon with the lapse of time. In contrast, the combination of the active ingredient and the promoter allows the photocatalyst to endure light for longer times.

In order to impregnate cesium in the carrier, cesium is first converted into an aqueous cesium carbonate ($Cs_2CO_3$) solution which is, then, impregnated in the carrier, according to an ordinary impregnation technique. Thereafter, the combined solution was stirred for 3 to 15 hours at 65 to 90° C. and dried. The resultant one may not be pulverized further.

The photocatalyst thus obtained can be used to produce hydrogen. For this, it is suspended in primary or secondary distilled water or simply pretreated water and placed under ultraviolet or visible light in a photoreactor, such as a closed, gas-circulating system, while stirring. In this state, hydrogen is efficiently produced even though the oxygen-containing organic compound promoter, such as formaldehyde and alcohol, used in Korean Pat. Appl'n. No. 95-7721, a previous patent of the present inventor, is not employed. The photoreaction is preferably carried out at 10 to 85° C. and more preferably at 15 to 35° C. and preferably at a pressure of 0.1 to 5 atm and more preferably at 1 atm.

A better understanding of the present invention may be obtained through the following examples which are set forth to illustrate, but are not to be construed as the limit of the present invention.

In the following examples, hydrogen productivity is defined as follows:

$$\text{Hydrogen productivity} = \frac{\text{Mole number of Hydrogen produced}}{\text{Reaction Time}}$$

PREPARATION EXAMPLE I

Preparation of ZnS Carrier 1.0 mol (58.9 g) of zinc and 0.1 mol (3.2 g) of sulfur were mixed together, pulverized in a ball mill for 28 hours at 110 rpm and sintered for 2 hours at 300° C., to prepare a ZnS carrier.

PREPARATION EXAMPLES II THROUGH VI

The procedure of Preparation Example I was repeated using 0.2 mol (6.4 g), 1.0 mol (32.0 g), 1.4 mol (44.8 g), 2.6 mol (83.2 g) and 2.8 mol (89.6 g) of sulfur, respectively instead of 0.1 mol (3.2 g) of sulfur.

PREPARATION EXAMPLE VII

Preparation of ZnS type Carrier 1.0 mol (58.9 g) of zinc, 1.4 mol (44.8 g) of sulfur and 44.44 g (30% by weight) of silica were mixed together, pulverized in a ball mill for 26 hours at 115 rpm and sintered for 2 hours at 300° C., to give a ZnS type carrier.

PREPARATION EXAMPLES VIII THROUGH XI

The same procedure with that of Preparation Example VII was repeated using alumina, niobate, titania and zirconia, respectively, instead of silica.

PREPARATION EXAMPLES XII AND XIII

Preparation of Photocatalyst containing Cs

Cs was converted into an aqueous $Cs_2CO_3$ solution and impregnated in the carriers obtained in Preparation Examples VII and VIII in such a manner that the amount of the Cs might be 0.1% by weight based on the total weight of the carrier by controlling the amount of the cesium carbonate. Thereafter, the resulting solution was stirred at 70° C. for 5 hours and dried, to give photocatalysts.

PREPARATION EXAMPLES XIV THROUGH XVI

Preparation of Photocatalyst comprising Cs and X (Ni, Co, Fe)

3.0 g of the photocatalyst obtained in Preparation Example XII was immersed in 250 ml of 0.01 M Co, Fe or Ni solution in water and the solution was stirred at 25° C. for 48 hours. The photocatalyst was washed with a copious amount of distilled water and filtered. The excess metal salt which might be on the surface of the catalyst was washed off so that the impregnation amount of Co, Fe or Ni might be 0.05% by weight based on the total weight of the carrier. Drying at 110° C. for 24 hours and sintering at 300° C. for 2 hours resulted in a novel photocatalyst.

EXAMPLES I THROUGH XVI

Each of 1.0 g of the photocatalysts obtained in Preparation Examples I through XVI was suspended in 500 ml of secondary distilled water and the suspension was placed in a closed, gas-circulating photoreactor and stirred at a speed of 400 rpm and then, irradiated by ultraviolet light from a high pressure mercury lamp, to produce hydrogen whose amounts was analyzed with gas chromatography. The results are given as shown in Table 1 below.

Before the start of the photoreaction, the air remaining in the closed, gas-circulating photoreactor was removed by using a vacuum system and argon gas was charged therein to an extent of 0.2 atm. The ultraviolet light may increase the temperature of the photoreactor. This can be prevented by circulating cooling water around the photoreactor. In the present invention, the photoreactor was kept at 15 to 20° C.

EXAMPLE XVII

Hydrogen was produced in the same manner as that of Example XII, except that visible light was used instead of ultraviolet light. The amount of hydrogen generated was analyzed and the result is given as shown in Table 1 below.

TABLE 1

Hydrogen Produced from Water in presence of Photocatalyst

| Exmp. | Catalyst | Light | Hydrogen ($\mu$mol/hr) |
|---|---|---|---|
| I | ZnS<br>Zn:S = 10:1 (mol) | uv | 17,510 |
| II | ZnS<br>Zn:S = 5:1 (mol) | uv | 17,542 |
| III | ZnS<br>Zn:S = 1:1 (mol) | uv | 28,540 |
| IV | ZnS<br>Zn:S = 1:1.4 (mol) | uv | 33,920 |
| V | ZnS<br>Zn:S = 1:2.6 (mol) | uv | 26,130 |
| VI | ZnS<br>Zn:S = 1:2.8 (mol) | uv | 24,930 |
| VII | ZnS, silica<br>Zn:S = 1:1.4 (mol)<br>ZnS:silica = 70:30 (wt %) | uv | 19,600 |
| VIII | ZnS, Alumina<br>Zn:S = 1:1.4 (mol)<br>ZnS:Alumina = 70:30 (wt %) | uv | 17,520 |
| IX | ZnS, Niobate<br>Zn:S = 1:1.4 (mol)<br>ZnS:Alumina = 70:30 (wt %) | uv | 20,210 |
| X | ZnS, Titania<br>Zn:S = 1:1.4 (mol)<br>ZnS:Titania = 70:30 (wt %) | uv | 28,900 |
| XI | ZnS, Zirconia<br>Zn:S 1:1.4 (mol)<br>ZnS:Zirconia = 70:30 (wt %) | uv | 17,820 |
| XII | Cs/ZnS, Silica<br>Zn:S = 1:1.4 (mol)<br>ZnS:Silica = 70:30 (wt %)<br>Impregnated Cs 0.1 wt % | uv | 22,421 |
| XIII | Cs/ZnS, Alumina<br>Zn:S = 1:1.4 (mol)<br>ZnS:Alumina = 70:30 (wt %)<br>Impregnated Cs 0.1 wt % | uv | 19,380 |
| XIV | Cs.Co/ZnS, Silica<br>Zn:S = 1:1.4 (mol)<br>ZnS:Silica = 70:30 (wt %)<br>Impregnated Cs 0.1 wt %<br>Co/(Cs + Co) = 33 wt % | uv | 24,320 |
| XV | Cs.Fe/ZnS, Silica<br>Zn:S = 1:1.4 (mol)<br>ZnS:Silica = 70:30 (wt %)<br>Impregnated Cs 0.1 wt %<br>Fe/(Cs + Fe) = 33 wt % | uv | 21,312 |
| XVI | Cs.Ni/ZnS, Silica<br>Zn:S = 1:1.4 (mol)<br>ZnS:Silica = 70:30 (wt %)<br>Impregnated Cs 0.1 wt %<br>Ni/(Cs + Ni) = 33 wt % | uv | 19,960 |
| XVII | Cs/ZnS, Silica<br>Zn:S = 1:1.4 (mol)<br>ZnS:Silica = 70:30 (wt %)<br>Impregnated Cs 0.1 wt % | visible | 14,380 |

Comparative Example I

A cesium carbonate solution in 10 ml of secondary distilled water was mixed with 5 g of $K_4Nb_6O_{17}$ carrier of lamellar structure in such a manner that the impregnation amount of cesium might be 1.0% by weight and the resulting solution was stirred overnight at 25° C. and dried in vacuo. Sintering at 200° C. for 3 hours gave $Cs/K_4Nb_6O_{17}$ photocatalyst. The amount of the hydrogen generated by using the photocatalyst was measured in the same manner as that of Examples and was found to be 370.6 $\mu$mol/hr.

Comparative Example II

The same procedure as that of Comparative Example I was repeated except that, instead of secondary distilled water, 20% by volume of an aqueous formaldehyde solution was used to increase the production amount of hydrogen.

Gas chromatography showed that the amount of hydrogen produced is 37,445.0 μmol/hr but, the reactants could not be reused owing to the addition of the organic compound.

Comparative Example III

The same procedure as that of Example I was repeated except that the molar ratio of Zn to S is 1:3. Gas chromatography showed that hydrogen was produced at an amount of 26,980 μmol/hr. However, when preparing the photocatalyst, the excess sulfur was found to be ignited too much.

Comparative Example IV

The same procedure as that of Example VII was repeated except that the weight ratio of ZnS to SiO$_2$ was 30:70. Gas chromatography showed that hydrogen was produced at an amount of 6,530 μmol/hr.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A photocatalyst for producing hydrogen, comprising the following general formula:

$$Cs(a)X(c)/T(b)$$

wherein "a" represents a percentage by weight of impregnated Cs on the basis of the weight of a carrier, being present in the amount of up to 6.0; "X" is a promoter selected from the group consisting of Ni, Co and Fe; "c" represents a percentage by weight of the promoter on the basis of the total weight of Cs and the promoter, being present in the amount of up to 50.0; "T" is the carrier comprising an inorganic compound and zinc sulfide having a molar ratio of zinc:sulfur ranging from 1:0.1 to 1:2.8; and "b" represents a percentage by weight of the inorganic compound on the basis of the total amount of said carrier, being up to 50.

2. The photocatalyst in accordance with claim 1, wherein said inorganic compound is selected from the group consisting of alumina, silica, niobate, titania and zirconia.

3. The photocatalyst in accordance with claim 1, wherein the inorganic compound is present in the carrier.

4. The photocatalyst in accordance with claim 1, wherein cesium is impregnated in the carrier.

5. The photocatalyst in accordance with claim 1, wherein the promoter is impregnated in the carrier.

6. The photocatalyst in accordance with claim 1, wherein cesium and the promoter are impregnated in the carrier.

7. A method for preparing a photocatalyst for hydrogen production, comprising the steps of:

mixing zinc and sulfur in a molar ratio of 1:0.1–2.8;

sufficiently pulverizing the mixture with a mechanical means; sintering the mixture at 200 to 700° C. for 2 to 5 hours, to give a ZnS carrier; and impregnating cesium, an active ingredient in the carrier.

8. A method in accordance with claim 7, further comprising the step of impregnating a promoter selected from the group consisting of Ni, Co and Fe, following the impregnation of cesium.

9. The method in accordance with claim 7, wherein cesium is impregnated in a form of an aqueous cesium carbonate solution.

10. The method in accordance with claim 7, further comprising the step of adding an inorganic compound selected from the group consisting of alumina, silica, niobate, titania and zirconia to the ZnS mixture at up to 50% by weight.

11. A method for producing hydrogen, in which a suspension of the photocatalyst of claim 1 in water is subjected to photoreaction by irradiating visible or ultraviolet light onto the suspension with stirring in a photoreactor.

12. The method in accordance with claim 11, wherein the photoreaction is carried out at 10 to 85° C. and at 0.1 to 5 atm.

* * * * *